US010235860B2

(12) United States Patent
Skidmore et al.

(10) Patent No.: US 10,235,860 B2
(45) Date of Patent: Mar. 19, 2019

(54) LOCATION BEACON ASSEMBLY

(71) Applicants: Irene Skidmore, Florence, TX (US); Clayton Skidmore, Florence, TX (US)

(72) Inventors: Irene Skidmore, Florence, TX (US); Clayton Skidmore, Florence, TX (US)

(*) Notice: Subject to any disclaimer, the term of this patent is extended or adjusted under 35 U.S.C. 154(b) by 274 days.

(21) Appl. No.: 15/248,129

(22) Filed: Aug. 26, 2016

(65) Prior Publication Data

US 2018/0059243 A1    Mar. 1, 2018

(51) Int. Cl.
| | |
|---|---|
| G08B 21/00 | (2006.01) |
| G08B 21/08 | (2006.01) |
| G08B 5/36 | (2006.01) |
| G01S 1/70 | (2006.01) |
| G01S 1/72 | (2006.01) |
| G08B 5/00 | (2006.01) |
| G01S 5/18 | (2006.01) |

(52) U.S. Cl.
CPC .............. *G08B 21/088* (2013.01); *G01S 1/70* (2013.01); *G01S 1/72* (2013.01); *G01S 1/725* (2013.01); *G01S 5/183* (2013.01); *G08B 5/002* (2013.01); *G08B 5/36* (2013.01)

(58) Field of Classification Search
CPC .................................................. G08B 21/088
See application file for complete search history.

(56) References Cited

U.S. PATENT DOCUMENTS

| | | | | |
|---|---|---|---|---|
| 2,462,839 | A | * | 3/1949 | Brown .................. G04B 27/08 368/291 |
| 5,097,254 | A | * | 3/1992 | Merrithew .......... G08B 21/088 340/529 |
| D389,077 | S | | 1/1998 | Miranda, Jr. |
| 6,154,140 | A | | 11/2000 | Thorpe et al. |
| 8,144,020 | B2 | | 3/2012 | Snyder et al. |
| 9,746,328 | B2 | * | 8/2017 | Salonen ................ G01C 21/12 |
| 2008/0205049 | A1 | * | 8/2008 | Brain ....................... B63C 9/20 362/158 |
| 2008/0266118 | A1 | | 10/2008 | Pierson et al. |
| 2009/0251321 | A1 | | 10/2009 | Delorey |
| 2010/0060462 | A1 | * | 3/2010 | Hollaway ................ G08B 5/36 340/573.6 |
| 2012/0120639 | A1 | | 5/2012 | Armer et al. |

FOREIGN PATENT DOCUMENTS

WO    WO2014075860    5/2014

* cited by examiner

*Primary Examiner* — Hovhannes Baghdasaryan

(57) ABSTRACT

A location beacon assembly includes a wrist band that may be worn on a wrist. A beacon unit is coupled to the wrist band. The beacon unit is turned on when the beacon unit is exposed to water. The beacon unit selectively emits blue light. Thus, the beacon unit is visible at a maximum depth in water thereby facilitating a swimmer to be located when the swimmer is drowning. The beacon selectively emits an echolocation sound that has a frequency ranging between 10 kHz and 20 kHz. Thus, the beacon unit is audible at a maximum depth in water thereby facilitating the swimmer to be located when the swimmer is drowning.

13 Claims, 5 Drawing Sheets

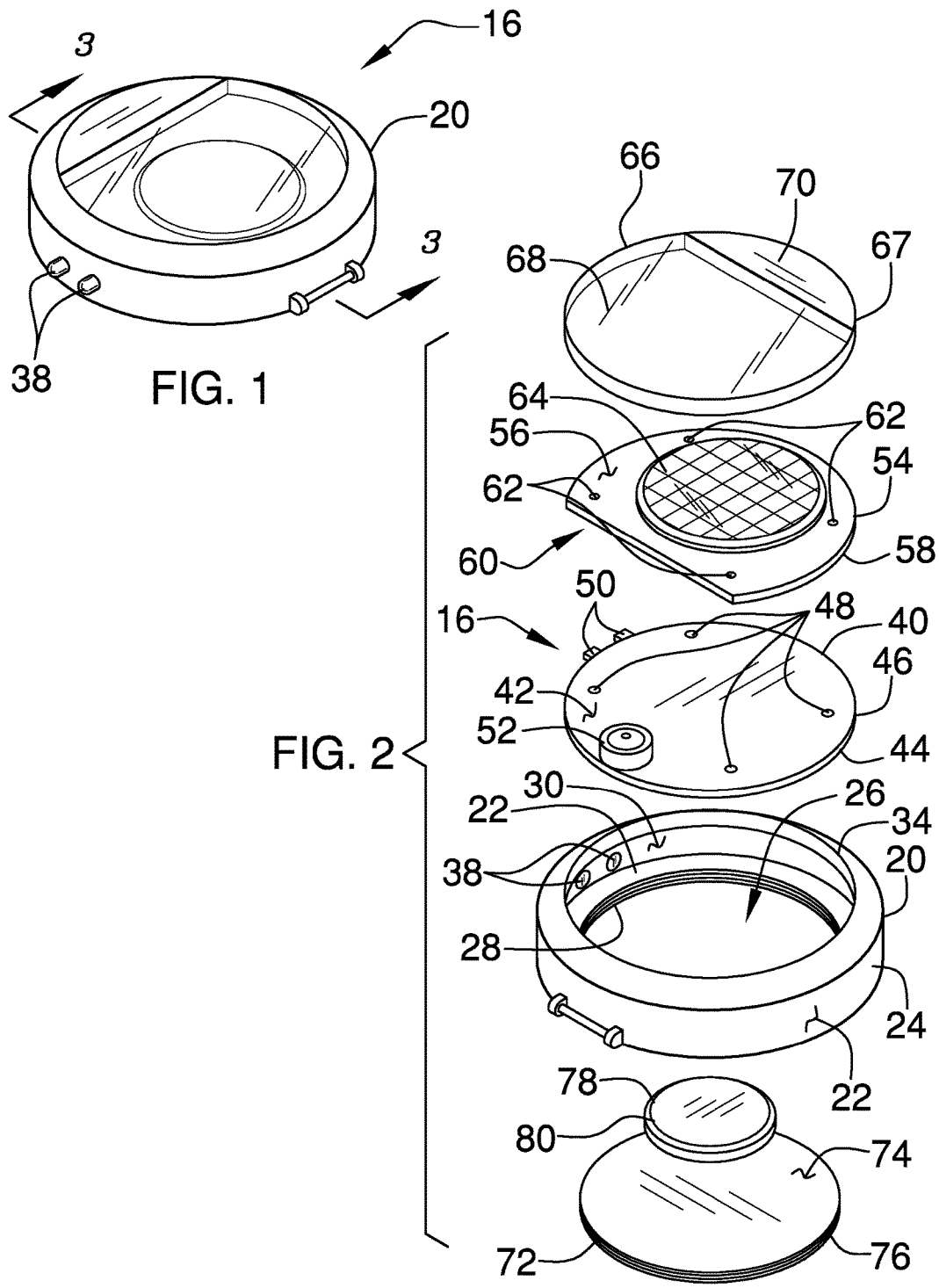

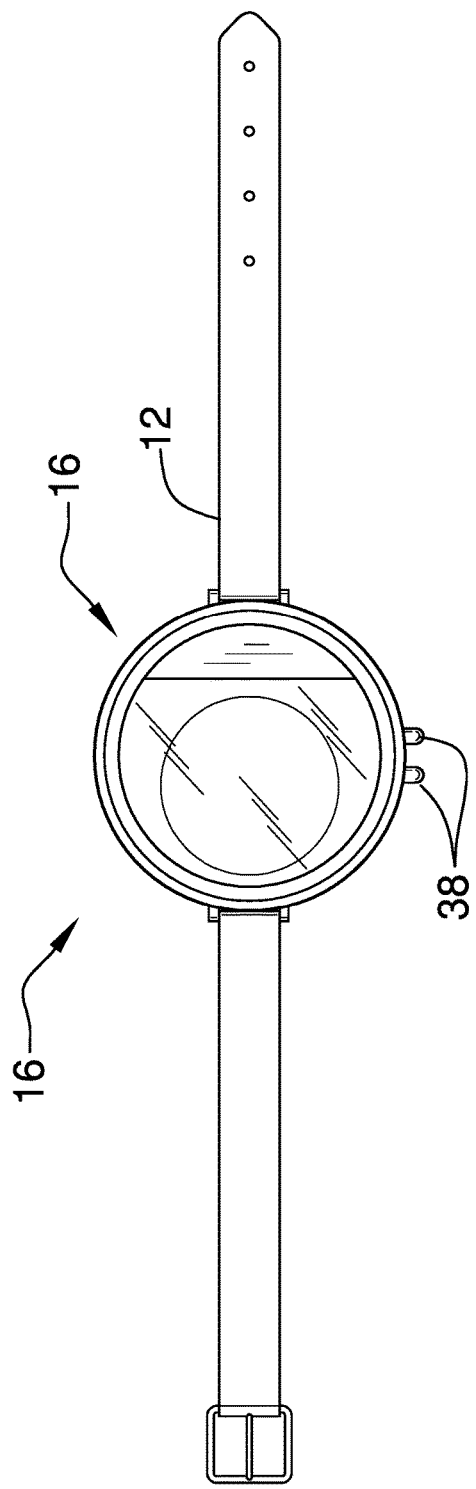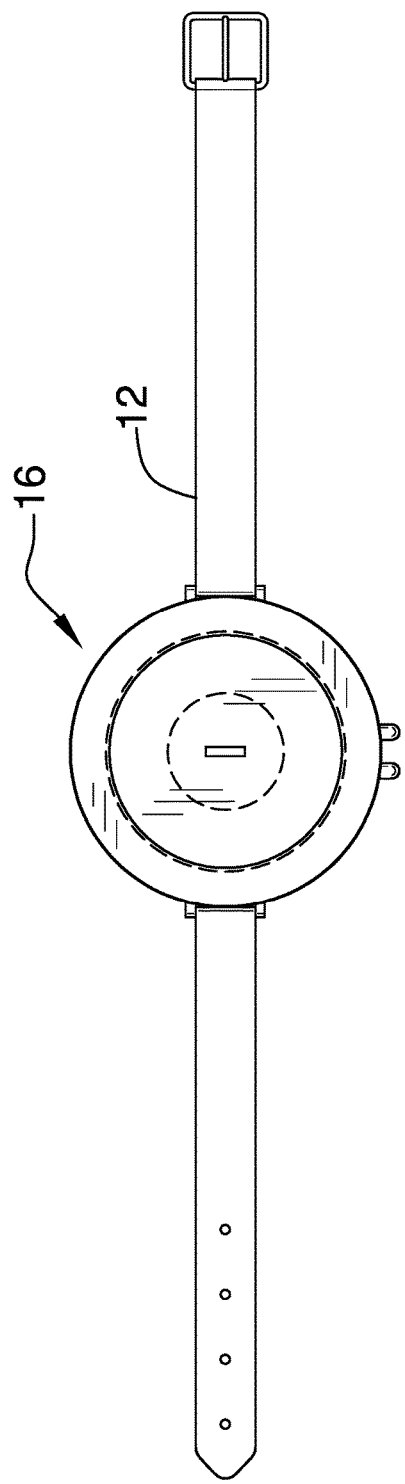

LOCATION BEACON ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to beacon devices and more particularly pertains to a new beacon device for locating a swimmer when the swimmer is drowning.

BRIEF SUMMARY OF THE INVENTION

An embodiment of the disclosure meets the needs presented above by generally comprising a wrist band that may be worn on a wrist. A beacon unit is coupled to the wrist band. The beacon unit is turned on when the beacon unit is exposed to water. The beacon unit selectively emits blue light. Thus, the beacon unit is visible at a maximum depth in water thereby facilitating a swimmer to be located when the swimmer is drowning. The beacon selectively emits an echolocation sound that has a frequency ranging between 10 kHz and 20 kHz. Thus, the beacon unit is audible at a maximum depth in water thereby facilitating the swimmer to be located when the swimmer is drowning.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a top perspective view of a location beacon assembly according to an embodiment of the disclosure.

FIG. 2 is an exploded perspective view of an embodiment of the disclosure.

FIG. 4 is a top view of an embodiment of the disclosure.

FIG. 5 is a bottom phantom view of an embodiment of the disclosure.

DETAILED DESCRIPTION OF THE INVENTION

Figure 3:
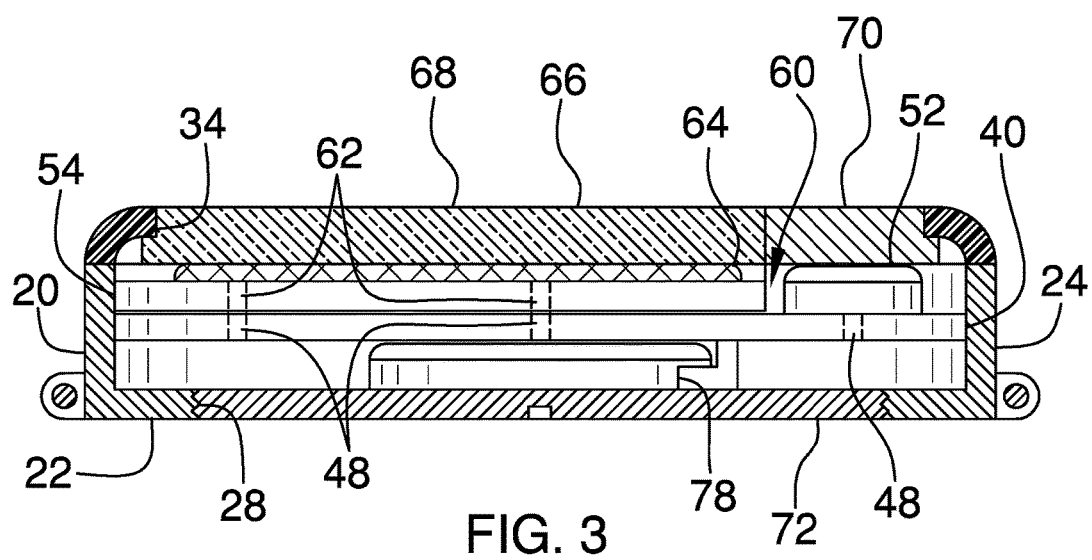
FIG. 3 is a cross sectional view taken along line 3-3 of FIG. 1 of an embodiment of the disclosure.
Figure 6:
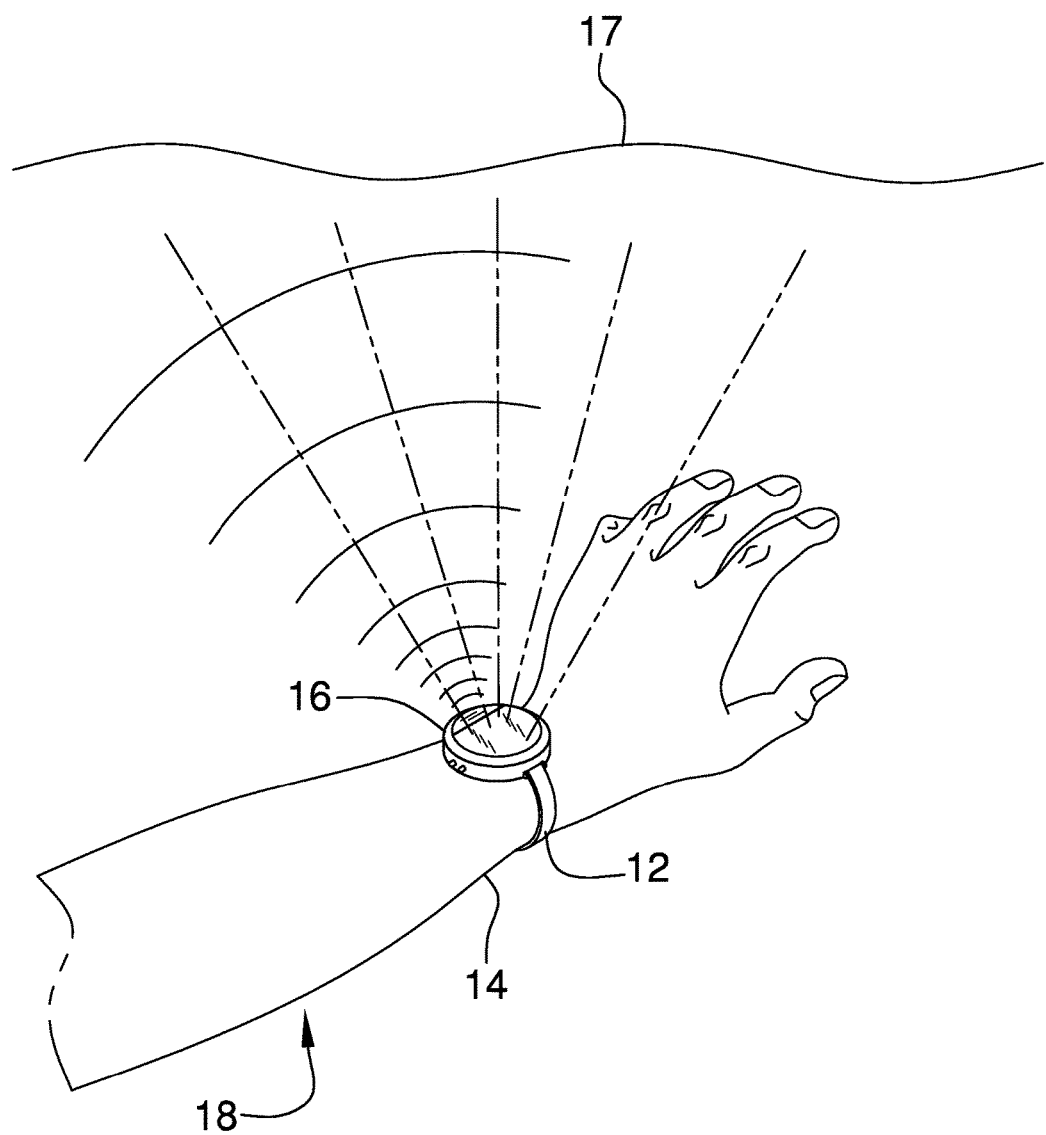
FIG. 6 is a perspective in-use view of an embodiment of the disclosure.
Figure 7:
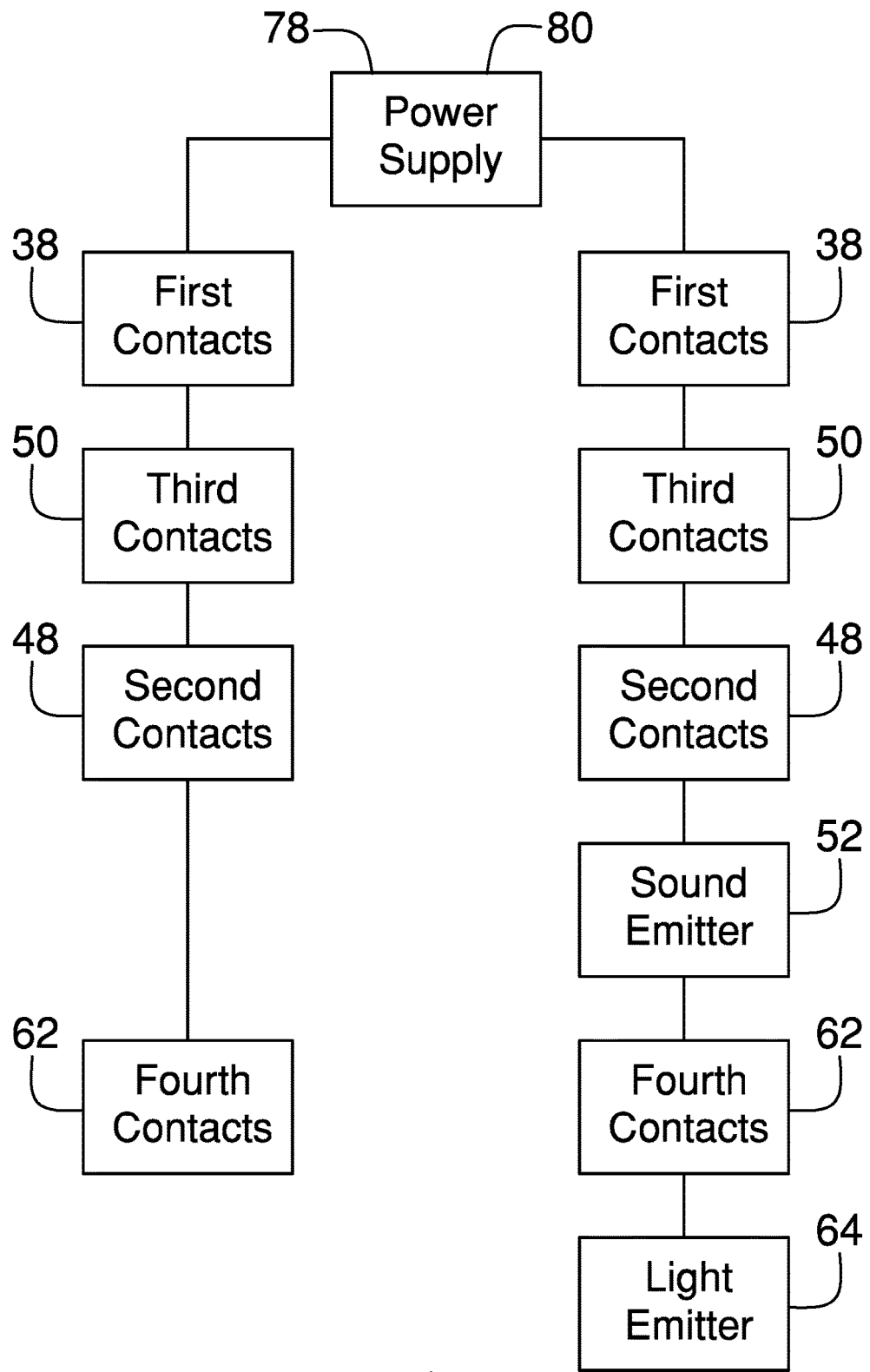
FIG. 7 is a schematic view of an embodiment of the disclosure.

With reference now to the drawings, and in particular to FIGS. 1 through 7 thereof, a new beacon device embodying the principles and concepts of an embodiment of the disclosure and generally designated by the reference numeral 10 will be described.

As best illustrated in FIGS. 1 through 7, the location beacon assembly 10 generally comprises a wrist band 12 may be worn on a wrist 14. A beacon unit 16 is coupled to the wrist band 12. The beacon unit 16 is turned on when the beacon unit 16 is exposed to water 17. The beacon unit 16 selectively emits blue light. Thus, the beacon unit 16 is visible at a maximum depth in water 17 thereby facilitating a swimmer 18 to be located when the swimmer 18 is drowning. The beacon unit 16 selectively emits an echolocation sound and the echolocation sound has a frequency ranging between 10 kHz and 20 kHz. Thus, the beacon unit 16 is audible at a maximum depth in water 17 thereby facilitating the swimmer 18 to be located when the swimmer 18 is drowning.

The beacon unit 16 comprises a housing 20 that has a bottom wall 22 and a peripheral wall 24 extending upwardly therefrom. The peripheral wall 24 is continuous such that the housing 20 forms a closed loop. The bottom wall 22 has an opening 26 extending therethrough. The opening 26 has a bounding edge 28 and the bounding edge 28 is threaded.

The peripheral wall 24 has an inner surface 30, an outer surface 32 and a distal edge 34 with respect to the bottom wall 22. The bottom wall 22 has an upper surface 36. The housing 20 is comprised of an electrically insulating material. Moreover, the housing 20 is comprised of a fluid impermeable material. The housing 20 is coupled to the wrist band 12 and the housing 20 is positioned on the wrist 14 when the wrist band 12 is worn. The distal edge 34 extends inwardly from the inner surface 30.

A pair of first contacts 38 is provided. Each of the first contacts 38 extends through the peripheral wall 24. Each of the first contacts 38 extending outwardly from the outer surface 32 and each of the first contacts 38 is flush with the inner surface 30. Each of the first contacts 38 is comprised of an electrically conductive material.

The first contacts 38 are spaced apart from each other such that each of the first contacts 38 is electrically insulated from each other. Thus, each of the first contacts 38 is in electrical communication with each other when the housing 20 is submerged in water 17. Each of the first contacts 38 is comprised of a corrosion resistant material. Thus, each of the first contacts 38 is inhibited from corrosion resulting in exposure to salt water 17.

A first circuit board 40 is provided. The first circuit board 40 has a top surface 42, a bottom surface 44 and an outer edge 46 extending therebetween. The first circuit board 40 is positioned within the housing 20. Thus, the bottom surface 44 of the first circuit board 40 abuts the upper surface 36 of the bottom wall 22. The first circuit board 40 is comprised of an electrically insulating material.

A plurality of second contacts 48 is provided. Each of the second contacts 48 extends through the top surface 42 and the bottom surface 44 of the first circuit board 40. The second contacts 48 are spaced apart from each other and are distributed around the first circuit board 40. Each of the second contacts 48 is comprised of an electrically conductive material.

A pair of third contacts 50 is provided. Each of the third contacts 50 is coupled to and extends outwardly from the outer edge 46 of the first circuit board 40. Each of the third contacts 50 is comprised of an electrically conductive material. Each of the third contacts 50 is in electrical communication with associated ones of the second contacts 48. Moreover, each of the third contacts 50 engages an associated one of the first contacts 38 when the first circuit board 40 is positioned in the housing 20. Thus, each of the third contacts 50 is electrical communication with the associated first contact 38.

A sound emitter 52 is coupled to the top surface 42 of the first circuit board 40. The sound emitter 52 is electrically coupled to associated ones of the second contacts 48. Thus, the sound emitter 52 emits the echolocation sound when each of the first contacts 38 is exposed to water 17. The sound emitter 52 may be an electronic sound emitter 52 or the like.

A second circuit board 54 is provided. The second circuit board 54 has a topmost surface 56 and a bottommost surface 58. The second circuit board 54 is comprised of an electrically insulating material. The second circuit board 54 is positioned in the housing 20 having the bottommost surface 58 abutting the top surface 42 of the first circuit board 40. The second circuit board 54 has a cut out 60. The cut out 60 is aligned with the sound emitter 52. Thus, the sound emitter 52 is exposed when the second circuit board 54 is positioned on the first circuit board 40.

A plurality of fourth contacts 62 is provided. Each of the fourth contacts 62 extends through the topmost surface 56 and the bottommost surface 58 of the second circuit board 54. Each of the fourth contacts 62 is comprised of an electrically conductive material. Each of the fourth contacts 62 is aligned with associated ones of the third contacts 50. Thus, each of the fourth contacts 62 is in electrical communication with the associated third contact when the second circuit board 54 is positioned in the housing 20.

A light emitter 64 is coupled to the topmost surface 56 of the second circuit board 54. The light emitter 64 is electrically coupled to associated ones of the fourth contacts 62. Thus, the light emitter 64 emits the blue light when each of the first contacts 38 is exposed to water 17. The light emitter 64 may comprise an LED or the like.

A lens 66 is provided that has an outermost edge 67. The outermost edge 67 is continuous such that the lens 66 forms a circle. The lens 66 is positioned in the housing 20. The outermost edge 67 forms a fluid impermeable seal with the inner surface 30 of the peripheral wall 24. The lens 66 is aligned with the distal edge 34 of the peripheral wall 24. The lens 66 contacts the water 17 when the housing 20 is submerged in the water 17.

The lens 66 is divided into a first portion 68 and a second portion 70. The first portion 68 is comprised of a translucent material. The first portion 68 is aligned with the light emitter 64. Thus, the light emitter 64 is visible through the lens 66.

The second portion 70 of the lens 66 is comprised of a metallic material. The second portion 70 is aligned with the sound emitter 52. The echolocation sound resonates with the second portion 70 of the lens 66. Thus, the second portion 70 of the lens 66 may amplify the echolocation sound. Additionally, the second portion 70 of the lens 66 transfers the echolocation sound into the water 17.

A disk 72 is provided that has an uppermost surface 74 and an outward edge 76. The outward edge 76 threadably engages the bounding edge 28 in the bottom wall 22 of the housing 20. The disk 72 forms a fluid impermeable seal with the housing 20. The disk 72 is comprised of rigid material.

A power supply 78 is coupled to the uppermost surface 74 of the disk 72. The power supply 78 is in electrical communication with associated ones of the second contacts 48 when the disk 72 is coupled to the housing 20. Thus, the power supply 78 is in electrical communication with each of first contacts 38. Moreover, the power supply 78 is in electrical communication with each of the sound emitter 52 and the light emitter 64 when each of the first contacts 38 is exposed to water 17. The water 17 completes a circuit between the power supply 78, the sound emitter 52 and the light emitter 64. The power supply 78 comprises at least one battery 80.

In use, the wrist band 12 is worn around the wrist 14 when the swimmer 18 goes swimming. Each of the light emitter 64 and the sound emitter 52 is turned on when the pair of first contacts 38 is exposed to water 17. The water 17 completes a circuit between the pair of first contacts 38. Thus, the light emitter 64 emits the blue light and the sound emitter 52 emits the echolocation sound. The blue light and the echolocation sound facilitate the swimmer 18 to be constantly located when the swimmer 18 is swimming. The blue light and the echolocation sound facilitate the swimmer 18 to be located when the swimmer 18 is drowning. Thus, rescue attempts are enhanced when the swimmer 18 is drowning.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A location beacon assembly being configured to be worn by a swimmer thereby facilitating the swimmer to be located in water, said assembly comprising:
   a wrist band being configured to be worn on a wrist; and
   a beacon unit being coupled to said wrist band, said beacon unit being configured to be turned on when said beacon unit is exposed to water, said beacon unit selectively emitting blue light wherein said beacon unit is configured to be visible at a maximum depth in water thereby facilitating a swimmer to be located when the swimmer is drowning, said beacon selectively emitting an echolocation sound having a frequency ranging between 10 kHz and 20 kHz wherein said beacon unit is configured to be audible at a maximum depth in water thereby facilitating the swimmer to be located when the swimmer is drowning, said beacon unit comprising
      a housing having a bottom wall and a peripheral wall extending upwardly therefrom, said peripheral being continuous such that said housing forms a closed loop, said bottom wall having an opening extending therethrough, said opening having a bounding edge, said bounding edge being threaded, said peripheral wall having an inner surface, an outer surface and a distal edge with respect to said bottom wall, said bottom wall having an upper surface,
      a light emitter,
      a sound emitter,
      a lens having an outermost edge, said outermost edge being continuous such that said lens forms a circle, said lens being positioned in said housing having said outermost edge forming a fluid impermeable seal with said inner surface of said peripheral wall, said lens being aligned with said distal edge of said peripheral wall, said lens being divided into a first portion and a second portion, said first portion being comprised of a translucent material, said first portion being aligned with said light emitter wherein said light emitter is configured to be visible, said second portion being comprised of a metallic material, said second portion being aligned with said sound emitter such that said echolocation sound resonates with said second portion wherein said second portion is configured to amplify said echolocation sound.

2. The assembly according to claim 1, wherein said housing is comprised of an electrically insulating material, said housing being comprised of a fluid impermeable material, said housing being coupled to said wrist band wherein said housing is configured to be positioned on the wrist.

3. The assembly according to claim 2, further comprising a pair of first contacts, each of said first contacts extending through said peripheral wall, each of said first contacts extending outwardly from said outer surface, each of said first contacts being flush with said inner surface, said first contacts being spaced apart from each other such that each of said first contacts is electrically insulated from each other wherein each of said first contacts being configured to be in electrical communication with each other when said housing is submerged in water, each of said first contacts being comprised of a corrosion resistant material.

4. The assembly according to claim 1, further comprising a first circuit board having a top surface, a bottom surface and an outer edge extending therebetween, said first circuit board being positioned within said housing having said bottom surface abutting said upper surface of said bottom wall.

5. The assembly according to claim 4, further comprising a plurality of second contacts, each of said second contacts extending through said top surface and said bottom surface of said first circuit board, said second contacts being spaced apart from each other and being distributed around said first circuit board.

6. The assembly according to claim 5, further comprising:
   a pair of first contacts being coupled to said housing; and
   a pair of third contacts, each of said third contacts being coupled to and extending outwardly from said outer edge of said first circuit board, each of said third contacts being in electrical communication with associated ones of said second contacts, each of said third contacts engaging an associated one of said first contacts when said first circuit board is positioned in said housing such that each of said third contacts is electrical communication with said associated first contact.

7. The assembly according to claim 6, further comprising a sound emitter being coupled to said top surface of said first circuit board, said sound emitter being electrically coupled to associated ones of said second contacts wherein said sound emitter is configured to emit said echolocation sound when each of said first contacts is exposed to water.

8. The assembly according to claim 1, further comprising:
   a first circuit board having a top surface;
   a sound emitter being coupled to said first circuit board; and
   a second circuit board having a topmost surface and a bottommost surface, said second circuit board being positioned in said housing having said bottommost surface abutting said top surface of said first circuit board, said second circuit board having a cut out, said cut out being aligned with said sound emitter such that said sound emitter is exposed when said second circuit board is positioned on said first circuit board.

9. The assembly according to claim 8, further comprising:
   a plurality of third contacts, each of said third contacts being coupled to said first circuit board; and
   a plurality of fourth contacts, each of said fourth contacts extending through said topmost surface and said bottommost surface of said second circuit board, each of said fourth contacts being aligned with associated ones of said third contacts such that each of said fourth contacts is in electrical communication with said associated third contact when said second circuit board is positioned in said housing.

10. The assembly according to claim 9, further comprising:
    a pair of first contacts; and
    a light emitter being coupled to said topmost surface of said second circuit board, said light emitter being electrically coupled to associated ones of said fourth contacts wherein said light emitter is configured to emit said blue light when each of said first contacts is exposed to water.

11. The assembly according to claim 1, further comprising a disk having an uppermost surface and a outward edge, said outward edge threadably engaging said bounding edge in said bottom wall of said housing such that said disk forms a fluid impermeable seal with said housing.

12. The assembly according to claim 11, further comprising:
    a plurality of second contacts;

a pair of first contacts;
a sound emitter;
a light emitter; and
a power supply being coupled to said uppermost surface of said disk, said power supply being in electrical communication with associated ones of said second contacts when said disk is coupled to said housing such that said power supply is in electrical communication with each of first contacts wherein said power supply is configured to be in electrical communication with each of said sound emitter and said light emitter when each of said first contacts is exposed to water, said power supply comprising at least one battery.

13. A location beacon assembly being configured to be worn by a swimmer thereby facilitating the swimmer to be located in water, said assembly comprising:
    a wrist band being configured to be worn on a wrist; and
    a beacon unit being coupled to said wrist band, said beacon unit being configured to be turned on when said beacon unit is exposed to water, said beacon unit selectively emitting blue light wherein said beacon unit is configured to be visible at a maximum depth in water thereby facilitating a swimmer to be located when the swimmer is drowning, said beacon selectively emitting an echolocation sound having a frequency ranging between 10 kHz and 20 kHz wherein said beacon unit is configured to be audible at a maximum depth in water thereby facilitating the swimmer to be located when the swimmer is drowning, said beacon unit comprising:
        a housing having a bottom wall and a peripheral wall extending upwardly therefrom, said peripheral being continuous such that said housing forms a closed loop, said bottom wall having an opening extending therethrough, said opening having a bounding edge, said bounding edge being threaded, said peripheral wall having an inner surface, an outer surface and a distal edge with respect to said bottom wall, said bottom wall having an upper surface, said housing being comprised of an electrically insulating material, said housing being comprised of a fluid impermeable material, said housing being coupled to said wrist band wherein said housing is configured to be positioned on the wrist,
        a pair of first contacts, each of said first contacts extending through said peripheral wall, each of said first contacts extending outwardly from said outer surface, each of said first contacts being flush with said inner surface, said first contacts being spaced apart from each other such that each of said first contacts is electrically insulated from each other wherein each of said first contacts being configured to be in electrical communication with each other when said housing is submerged in water, each of said first contacts being comprised of a corrosion resistant material,
        a first circuit board having a top surface, a bottom surface and an outer edge extending therebetween, said first circuit board being positioned within said housing having said bottom surface abutting said upper surface of said bottom wall,
        a plurality of second contacts, each of said second contacts extending through said top surface and said bottom surface of said first circuit board, said second contacts being spaced apart from each other and being distributed around said first circuit board,
        a pair of third contacts, each of said third contacts being coupled to and extending outwardly from said outer edge of said first circuit board, each of said third contacts being in electrical communication with associated ones of said second contacts, each of said third contacts engaging an associated one of said first contacts when said first circuit board is positioned in said housing such that each of said third contacts is electrical communication with said associated first contact,
        a sound emitter being coupled to said top surface of said first circuit board, said sound emitter being electrically coupled to associated ones of said second contacts wherein said sound emitter is configured to emit said echolocation sound when each of said first contacts is exposed to water,
        a second circuit board having a topmost surface and a bottommost surface, said second circuit board being positioned in said housing having said bottommost surface abutting said top surface of said first circuit board, said second circuit board having a cut out, said cut out being aligned with said sound emitter such that said sound emitter is exposed when said second circuit board is positioned on said first circuit board,
        a plurality of fourth contacts, each of said fourth contacts extending through said topmost surface and said bottommost surface of said second circuit board, each of said fourth contacts being aligned with associated ones of said third contacts such that each of said fourth contacts is in electrical communication with said associated third contact when said second circuit board is positioned in said housing,
        a light emitter being coupled to said topmost surface of said second circuit board, said light emitter being electrically coupled to associated ones of said fourth contacts wherein said light emitter is configured to emit said blue light when each of said first contacts is exposed to water,
        a lens having an outermost edge, said outermost edge being continuous such that said lens forms a circle, said lens being positioned in said housing having said outermost edge forming a fluid impermeable seal with said inner surface of said peripheral wall, said lens being aligned with said distal edge of said peripheral wall, said lens being divided into a first portion and a second portion, said first portion being comprised of a translucent material, said first portion being aligned with said light emitter wherein said light emitter is configured to be visible, said second portion being comprised of a metallic material, said second portion being aligned with said sound emitter such that said echolocation sound resonates with said second portion wherein said second portion is configured to amplify said echolocation sound,
        a disk having an uppermost surface and a outward edge, said outward edge threadably engaging said bounding edge in said bottom wall of said housing such that said disk forms a fluid impermeable seal with said housing, and
        a power supply being coupled to said uppermost surface of said disk, said power supply being in electrical communication with associated ones of said second contacts when said disk is coupled to said housing such that said power supply is in electrical communication with each of first contacts wherein said power supply is configured to be in electrical communication with each of said sound emitter and said light emitter when each of said first contacts is exposed to water, said power supply comprising at least one battery.

* * * * *